United States Patent
Kasapi et al.

(10) Patent No.: US 6,778,513 B2
(45) Date of Patent: Aug. 17, 2004

(54) METHOD AND APPARATUS FOR SEPARTING MULTIPLE USERS IN A SHARED-CHANNEL COMMUNICATION SYSTEM

(75) Inventors: Athanasios A. Kasapi, San Francisco, CA (US); Mitchell D. Trott, Mountain View, CA (US); David M. Parrish, Amherst, NY (US); Craig H. Barratt, Redwood City, CA (US)

(73) Assignee: ArrayComm, Inc., San Jose, CA (US)

( * ) Notice: Subject to any disclaimer, the term of this patent is extended or adjusted under 35 U.S.C. 154(b) by 39 days.

(21) Appl. No.: 09/918,910

(22) Filed: Jul. 30, 2001

(65) Prior Publication Data

US 2002/0058525 A1 May 16, 2002

Related U.S. Application Data

(63) Continuation of application No. 09/677,462, filed on Sep. 29, 2000, now abandoned.

(51) Int. Cl.[7] .............................................. H04Q 7/00
(52) U.S. Cl. .................. 370/330; 370/328; 370/327; 370/341; 370/310.2; 370/442; 370/432; 370/458
(58) Field of Search ................. 370/328–330, 370/334, 337, 341, 347, 431, 432, 442, 458, 461, 462, 310, 310.2

(56) References Cited

U.S. PATENT DOCUMENTS

| | | | | |
|---|---|---|---|---|
| 4,653,076 A | * | 3/1987 | Jerrim et al. ............... | 375/367 |
| 5,347,535 A | * | 9/1994 | Karasawa et al. .......... | 370/342 |
| 5,544,196 A | * | 8/1996 | Tiedemann et al. ........ | 375/145 |
| 5,787,130 A | * | 7/1998 | Kotzin et al. ............... | 375/346 |
| 5,930,248 A | * | 7/1999 | Langlet et al. ............. | 370/347 |
| 6,049,538 A | * | 4/2000 | Scott .......................... | 370/347 |
| 6,178,197 B1 | * | 1/2001 | Froelich et al. ............ | 375/150 |
| 6,236,862 B1 | * | 5/2001 | Erten et al. ................. | 455/501 |
| 6,393,002 B1 | * | 5/2002 | Paneth et al. ............... | 370/330 |
| 6,563,856 B1 | * | 5/2003 | O'Shea ....................... | 375/130 |

FOREIGN PATENT DOCUMENTS

| | | | |
|---|---|---|---|
| EP | 1111948 A1 | | 6/2001 |
| GB | 2301734 A | * | 12/1996 |
| WO | WO 9613909 | * | 5/1996 |
| WO | WO 98/36598 | | 8/1998 |
| WO | WO 98/59443 | | 12/1998 |

OTHER PUBLICATIONS

Okamoto, Garret T., "Smart Antenna Systems and Wireless Lans—Chapter 4—Smart Wireless LAN System Design," 11 pages plus cover.

* cited by examiner

*Primary Examiner*—Nay Maung
*Assistant Examiner*—Sujatha Sharma
(74) *Attorney, Agent, or Firm*—Blakely, Sokoloff, Taylor & Zafman LLP

(57) ABSTRACT

A method and apparatus for distinguishing between two or more signals, each associated with a particular remote user terminal, in a shared-channel wireless communication system. A communication device, for example, a base station, causes an offset (e.g., a time and/or a frequency offset) between the transmission of first and second uplink signals that simultaneously occupy the same channel and that are transmitted by first and second remote user terminals, respectively. According to one aspect of the invention, the offset is relatively small enough such that the first and second uplink signals remain within the same channel, but relatively large enough such that based on the offset, the communication device may identify that the first uplink signal is associated with the first remote user terminal.

51 Claims, 3 Drawing Sheets

METHOD AND APPARATUS FOR SEPARTING MULTIPLE USERS IN A SHARED-CHANNEL COMMUNICATION SYSTEM

RELATED PATENT APPLICATIONS

This is a continuation of U.S. patent application Ser. No. 09/677,462, filed Sep. 29, 2000, now abandoned entitled "Method and Apparatus for Separating Multiple Users in a Shared-Channel Communication System."

FIELD OF THE INVENTION

The present invention relates to the field of wireless communications systems, and in particular, to a method and system for separating and/or distinguishing between signals associated with multiple remote user terminals occupying the same channel.

BACKGROUND OF THE INVENTION

One advance in increasing the capacity of communication systems has been in the area of resource sharing or multiple access. Examples of multiple access techniques include code division multiple access (CDMA), frequency division multiple access (FDMA), and time division multiple access (TDMA). For example, in a TDMA system, each remote user terminals communicates with a hub communication device (e.g., a base station) in a frequency channel shared with other remote user terminals, but in its own (i.e., non-overlapping) time slot. As such, in a TDMA system, multiple remote user terminals may communicate with the hub communication device within the same frequency channel, but within non-overlapping time slots. (The term "channel" as used herein refers to any one or a combination of conventional communication channels, such as frequency, time, code channels).

Typically, a wireless communication network will include a number of hub communication devices distributed over a geographic region to service several remote user terminals, as well as to allow the same channels to be reused. For example, in voice and/or data cellular communication networks, the same channel may be used by more than one hub communication device if the possibility of interference is limited, for example, due to geographic separation of hubs occupying the same channel(s) or geographic obstructions. Generally, there is a trade-off between channel reuse and capacity of remote user terminals that can be accommodated in a wireless communication network.

Although antennas have sometimes been one of the neglected components of wireless systems, relatively recent development in the field of (adaptive) antenna arrays and "smart antennas" have not only realized significant improvements in geographic capacity, but also in signal-to-noise ratio (SNR), interference reduction, directionality, spatial diversity, power efficiency, and security. Accordingly, employment of antenna arrays has been proposed in a number of different wireless applications, including, but not limited to, radio communication systems, cellular systems, television broadcasting, paging systems, medical applications, etc.

Antenna arrays typically include a number of antennas that are spatially separated and coupled to one or more processors. Adaptive antenna arrays, or simply, adaptive arrays, periodically analyze the signals received from each of the antennas in an array to distinguish between one or more desired signals (e.g., from a desired source, such as a cellular telephone or other communication device) and one or more undesired signals (e.g., interference from users of other hubs sharing the same frequency, interference from other radio frequency (RF) emissions overlapping in channel, Johnson noise, multipath, or other interference sources, etc. Because adaptive array systems may sometimes be able to distinguish between spatially distinct sources (e.g., two cellular user units at different locations), such systems are sometimes referred to as "spatial processing" or "spatial division multiple access (SDMA)" systems. In general, adaptive array systems provide relatively significant improvement in performance relative to single antenna element systems.

FIG. 1A is a diagram depicting a simplified radiation pattern of an antenna array system, according to the prior art. In the system shown in FIG. 1A, an antenna array 10 transmits (downlink) signals to and/or receives (uplink) signals from a desired source 12, such as a mobile or stationary remote user terminal (e.g., a cellular voice and/or data communication device, a PDA having wireless capability, etc.). As shown, a beamforming pattern 8, which represents the transmission and/or reception directional gain pattern (depicted for only two dimensions) for the antenna array 10, includes a region of enhanced gain 6, as well as a region of relatively minimized gain or "null" region 2 and another region of relatively minimized gain or null 4.

The null regions 2 and 4 represent one of the advantages of adaptive arrays and "smart antenna" processing. In particular, each of the nulls 2 and 4 represent a represent a region or direction of relatively minimized gain with respect to the beamforming pattern of the antenna array 10. As such, the antenna array 10 typically directs a null in the direction of an interfering source. To this end, the null 2 is directed toward an interfering source 14, while the null 4 is directed to the interfering source 16. The interfering sources 14 and 16 each may represent a moving car, another mobile or stationary remote user terminal in communication with the antenna array 10 or another communication device (e.g., a base station that may or may not include an antenna array), etc., which may cause interference. As such, null generation may be viewed as interference mitigation, and each "null region" may be referred to as an interference mitigated region.

By enhancing the gain in the direction of desired source, while diminishing (and ideally reducing to zero) the gain in the direction of one or more interfering sources, the antenna array 10 may "directionally" receive and transmit signals, and as such, increase system capacity, decrease interference to the desired source(s), etc.

FIG. 1B is a graphical representation of a beamforming pattern for the antenna array 10 shown in FIG. 1A, according to the prior art. In FIG. 1B, the level of the transmission (downlink) and reception (uplink) gain of the antenna array 10 is depicted on the vertical axis and (spatial) direction is shown on the horizontal axis. As shown, there is relatively greater gain in the direction of the desired source 12, which corresponds to the enhanced gain region 6, than there is toward the interfering source 14, which corresponds to the null region 2, or the interfering source 16, which corresponds to the null region 4.

It should be appreciated that the term "null" as used in the context of adaptive array systems does not necessarily mean, and often does not mean, a region of zero electromagnetic energy, since nulls may often include some level of gain, though typically less than the enhanced region 6. Ideally, a communication device employing an adaptive array would direct a null having zero gain toward an interfering source. Furthermore, the closer the gain value of a null is to zero, the more intense or "deep" the null is. Thus, the "amount of nulling" that an antenna array or adaptive array system may generate may be defined one or both the number of nulls and the intensity of such nulls, such that the greater the amount of nulling, the greater the number of nulls generated and/or the more intense/deep one or more nulls are. As shown in FIG. 1B, for example, the null 2 is less intense than the null 4, since the latter represents less gain (and greater nulling intensity).

Regardless of the type of communication system or multiple access technology, a "hub" communications device, such as a base station or portion thereof, generally should be able to: (1) sufficiently recover the desired signal from all the signals received on a given channel; and (2) determine the identity of the source of each desired signal. For example, in a cellular communication system that includes a number of base stations each acting as a hub, when two or more remote user terminals are communicating with their corresponding hubs on the same reused channels, each cellular base station should be able to perform steps (1) and (2) for each signal or set of signals associated with a particular "desired" remote user terminal, while discarding the signal(s) associated with interfering sources.

In a spatial processing system, wherein the hub communication device may be part of a base station that accommodates "spatial channels," two or more remote users may often share the same frequency and time slot for transmission and/or reception with the hub device. As such, two remote user terminals may simultaneously be "desired" sources, yet be relatively indistinguishable by a hub communication device because they share the same channel. Although a spatial processing-capable hub communication device may be able to distinguish between the transmissions of the remote user terminals in some instances, in other instances (e.g., if the two sources have similar spatial or spatio-temporal characteristics), the transmissions from the two or more remote user terminals may be inadequately indistinguishable.

Thus, what is needed is a method and apparatus to separate and/or distinguish between signals from two or more wireless communication devices (e.g., remote user terminals) simultaneously occupying the same channel.

SUMMARY OF THE INVENTION

A method and apparatus is provided for distinguishing between two or more signals, each associated with a particular remote user terminal, in a shared-channel wireless communication system. A communication device, for example, a base station, causes an offset (e.g., a time and/or a frequency offset) between the transmission of first and second uplink signals'that simultaneously occupy the same channel and that are transmitted by first and second remote user terminals, respectively. According to one aspect of the invention, the offset is relatively small enough such that the first and second uplink signals remain within the same channel, but relatively large enough such that based on the offset, the communication device may identify that the first uplink signal is associated with the first remote user terminal.

DETAILED DESCRIPTION

The present invention provides a method and apparatus to distinguish between signals from two or more sources in a shared-channel communication system. In one embodiment, the relative arrival times of uplink signals from the two or more sources sharing the same carrier frequency and the same time slot are such that when a hub communications device, such as a base station, processes the combined uplink signals from the two or more sources to recover the signal associated with a desired source, the undesired signal (s) appear uncorrelated or otherwise "invalid." In another embodiment, the relative carrier frequencies of uplink signals from the two or more sources sharing the same channel are such that when a hub communications device processes the combined uplink signals from the two or more sources to extract a "desired" signal with a particular carrier frequency, the undesired signal(s) with different carrier frequencies appear uncorrelated or otherwise "invalid."

It will be appreciated that the invention may be utilized in various types of wireless architectures and applications. For instance, the invention may be utilized in time division duplex (TDD) or frequency division duplex (FDD) systems or other wireless architectures. The invention is particularly useful in spatial channel systems, where multiple remote user terminals may be sharing the same channel in the same geographic region, and the signal from each remote user terminal can be made relatively distinct by its spatial properties as measured at multiple receiving antennae of a communication device (e.g., an adaptive array base station). In such systems, the present invention may substantially enhance the ability of the antenna array communication device (e.g., a base station) to distinguish between two or more sources. It should further be appreciated that the invention may be employed in conjunction with TDMA, CDMA, and/or FDMA communication systems as well.

As used herein, a "base station" differs from a remote user terminal, to the extent that a base station may process signals from one or multiple remote user terminals at the same time, and the base station is typically coupled to a network (e.g., the public switched telephone network (PSTN), the Internet, and/or other voice and/or data network). The invention is not limited, however, to any one type of wireless communication system or device, but may find use in a variety of wireless applications wherein multiple transmitting devices may be sharing frequency, code, and/or time channels. Although one embodiment of the invention is described with reference to a base station that includes an adaptive array for supporting spatial channels, it should be appreciated that one or more remote user terminals may also include an antenna array. As such, the method and apparatus of the invention may also be embodied, at least in part, by a remote user terminal.

Figure 1A:
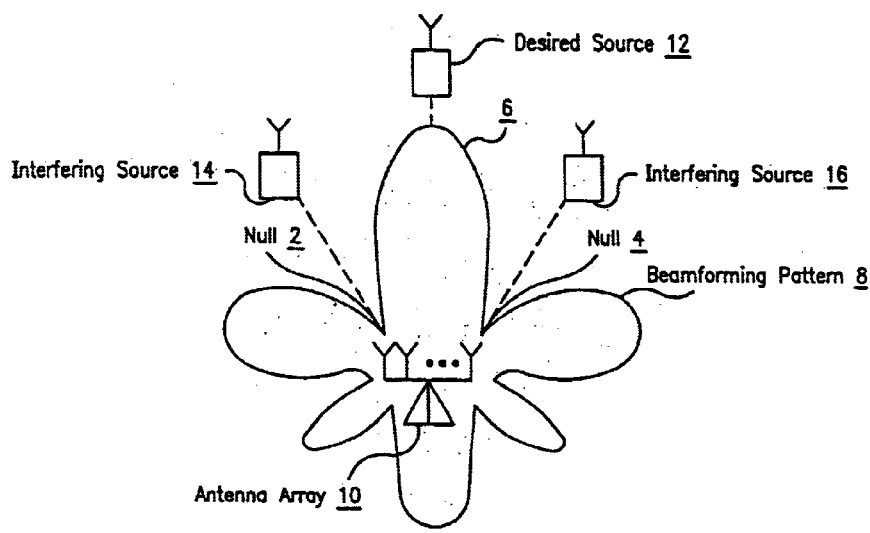
FIG. 1 is a diagram depicting a simplified beamform pattern in an antenna array system, according to the prior art.
Figure 1B:
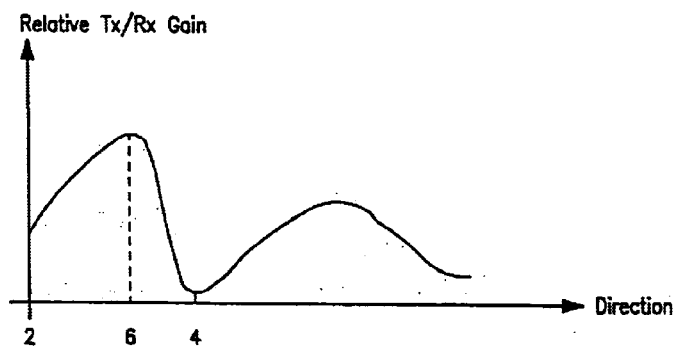
Figure 2:
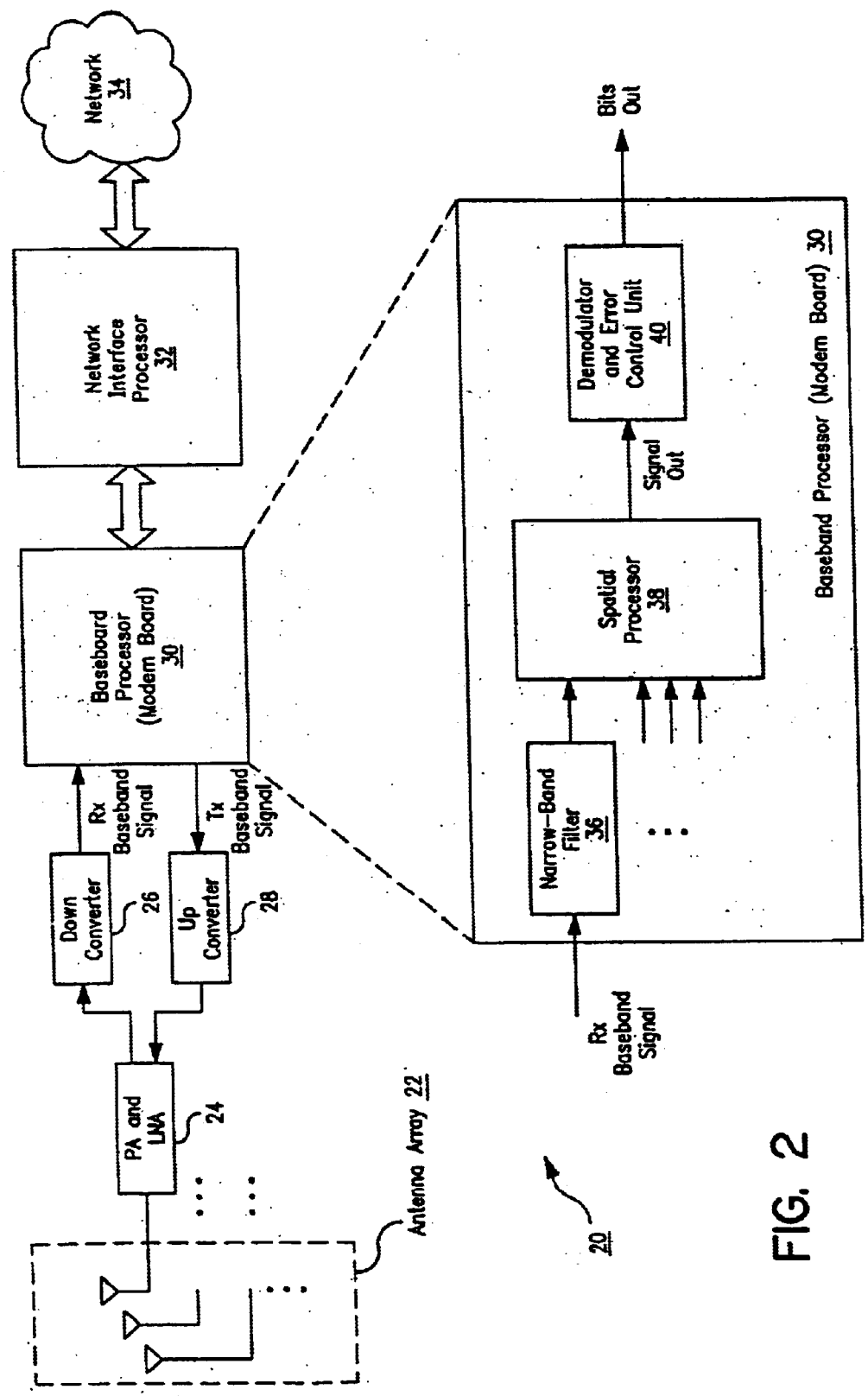
FIG. 2 is a block diagram of an adaptive array system employing spatial channels and a mechanism for separating users simultaneously occupying the same channel, according to one embodiment of the invention.

FIG. 2 is a block diagram of an adaptive array system employing spatial channels and a mechanism for separating remote user terminals that simultaneously occupy the same channel, according to one embodiment of the invention. As shown, a system 20, which may be part of a base station, in one embodiment, includes an antenna array 22, which in turn includes a number of antenna elements. The antenna array 22 is utilized for transmitting a downlink signal to a remote user terminal and for receiving an uplink signal from the remote user terminal. Of course, the system 20 may communicate with several remote user terminals, and as such, may process a number of signals each associated with a remote user terminal or other signal source. Furthermore, the system 20 may be employed in each of several base stations in wireless communication network, where each base station uses a given set of channels to communicate with remote user terminal units within a given geographic region. Such remote user terminals may be stationary or mobile, and may communicate voice and/or data with the system 20.

As shown in FIG. 2, each antenna element of the antenna array 22 is coupled to a power amplifier (PA) and low-noise amplifier (LNA) 24. The PA and LNA 24 of each antenna element amplifies the received (uplink) and/or transmitted (downlink) signal. As shown, each PA and LNA 24 is coupled to a down-converter 26 and an up-converter 28. The down-converter 26 converts the "raw" signal received by the antenna array 22 on a carrier frequency into a receive (Rx) baseband signal, which is provided to a baseband processor (also referred to as a modem board) 30. The up-converter 28, conversely, converts a transmit (Tx) baseband signal provided by the baseband processor 30 into a carrier frequency transmit signal, which is provided to the PA and LNA 24 to be transmitted (e.g., to a remote user terminal). Although not shown, analog-to-digital conversion (ADC) circuitry may be coupled between the down-converter 26 and the baseband processor 30, and similarly between the up-converter 28 and the baseband processor 30, to convert analog Rx baseband signals to digital Rx baseband signals and digital Tx baseband signals to analog Tx baseband signals, respectively.

The baseband processor 30 typically includes hardware (e.g., circuitry) and/or software (e.g., machine-executable code/instructions stored on a data storage medium/device) to facilitate processing of receive (uplink) and transmit (downlink) signals. In accordance with the embodiment of the invention shown in FIG. 2, the baseband processor 30 includes at least one narrow-band filter 36 to filter received signals (e.g., to decrease interference between the uplink signals of two or more remote user terminals in communication with the system 20). The filtered signal from the narrow-band filter 36, in turn, is provided to a spatial processor 38.

The spatial processor 38 typically includes at least one general purpose and/or digital signal processors (DSP) to facilitate spatial or spatio-temporal processing. As such, the spatial processor 38, based on the spatio-temporal characteristic(s) of one or more downlink signals, is able to transmit and receive signals between one or more remote user terminals in a spatially selective manner. Accordingly, in one embodiment, two or more remote user terminals may simultaneously occupy the same carrier frequency channel but may be distinguishable by the system 20 based on their unique spatial or spatio-temporal characteristic(s).

In accordance with one embodiment of the invention, the spatial processor 38's capability to distinguish between two or more remote user terminals in communication therewith (or with another base station or other receiver) is further enhanced by the system 20 causing an offset (e.g., a time and/or frequency offset) between the transmissions of such remote user terminals. In accordance with one embodiment, the offset is such that the (uplink) signals each transmitted by one of the at least two remote user terminals occupy the same channel—i.e., remain within the tolerance of a given channel—at a given time, but the uplink signals are offset relatively slightly between each other such that the spatial processor 38 can distinguish between the transmissions of the two or more remote user terminals.

As shown in FIG. 2, the spatial processor 38 is further coupled to a demodulator and error control unit 40, which receives the "extracted" signal(s) from the spatial processor 38, and outputs the extracted signal. The unit 40 may perform error correction, provide packet overhead, and/or perform other processing before outputting the uplink information in the form of digital data to a network processor 32.

The network processor 32, which may or may not constitute part of the system 20, facilitates the transfer of information between the system 20 and an external network 34. For example, a remote user terminal may include a cellular telephone, two pager, or other communication device whose user is in communication with a hard-wired telephone user at a remote location, in which case the network interface processor 32 may perform processing to facilitate routing the signals between the remote user terminal(s) and the network 34, which in this example may include the public switched telephone network (PSTN), the Internet, and/or other voice and/or data network. Similarly, the remote user terminal may include a computing device (e.g., a portable digital assistant, a laptop/notebook computer, a computing cellular telephone handset, etc.), along with a Web-browser, in which case the network 34 may represent the Internet and the network interface processor may facilitate communication between the remote user terminal (via the system 20) and one or more servers or other data processing systems coupled to the Internet. As such, voice and/or data (e.g., video, audio, graphics, text, etc.) may be transferred between the system 20 (and one or several remote user terminals in communication therewith) and an external network 34.

Figure 3:
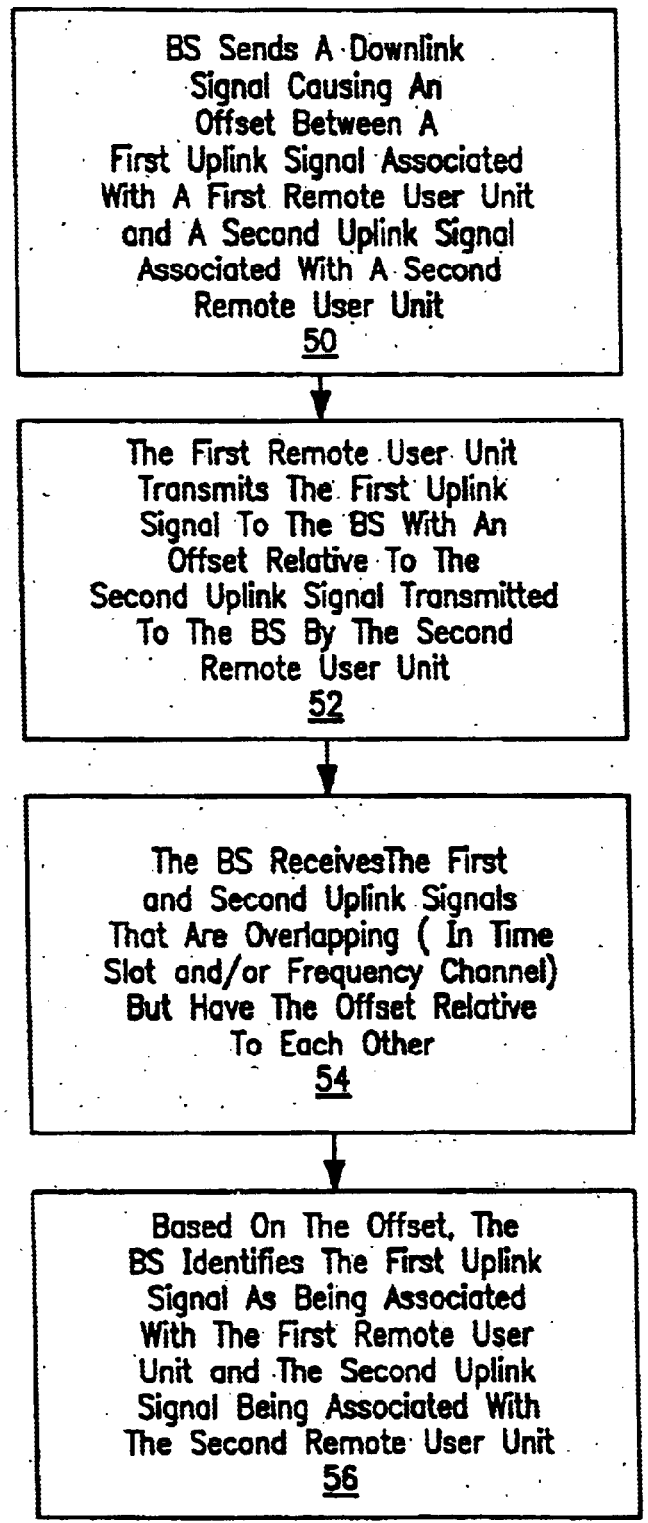
FIG. 3 is a flow diagram of a method for separating users in a shared-channel communication system, according to one embodiment of the invention

FIG. 3 is a flow diagram of a method for separating users in a shared-channel communication system, according to one embodiment of the invention. The phrase "shared channel" generally refers to signals (e.g., uplink transmissions from two or more remote user terminals or downlink transmissions to two or more remote user terminals) occupying the same channel. For example, in a TDMA channel, there is in theory one exact time at which a particular remote user terminal's signal is received by a base station. In practice, however, there is generally a range of time(s)—i.e., an allowable channel tolerance, and in this case, a time channel tolerance—in which the remote user terminal's signal may arrive at a base station. One reason for providing an allowable channel tolerance in a system is to account for the varying times signals may be received at a base station, for example, due to the varying distances of remote user terminals relative to the base station. As described in connection with one embodiment, the present invention exploits the allowable time, frequency, code or other channel tolerance of a system to offset two or more signals occupying the same channel such that the two or more signals are still within an allowable channel tolerance, but may be separated and distinguished relative to each other.

At block 50, a base station (BS) transmits a downlink signal that causes an offset to occur between a first uplink signal associated with a first remote user terminal and a second uplink signal associated with a second remote user terminal. For example, the first and second remote user terminals may include mobile or stationary communication devices (e.g., a cellular telephone, a laptop computer having wireless communication capability, a personal digital assistant (PDA) having wireless communication capability, etc.). In the embodiment described, the first and second remote user terminals operate on the same frequency or substantially same frequency channel and also share the same or substantially same time slot for transmission/reception. As such, the signals to and from the first and second remote user terminals at least partially overlap, in frequency and in time. In one embodiment, the base station is capable of spatial processing, and each of the first and second remote user terminals occupies a unique spatial channel. An example of a spatial processing system, as may be utilized in one embodiment of the invention, is described in U.S. Pat. No. 5,515,378, entitled, "Spatial Division Multiple Access Wireless Communication Systems," which is assigned to the assignee of the present invention, and which is hereby incorporated herein by reference.

At block 52, the first remote user terminal transmits the first uplink signal to the BS such that the first uplink signal is offset relative to the second uplink signal transmitted to the BS by the second remote user terminal. In one embodiment, the first and second uplink signals are offset relative to each other in time, such that one of the first and second uplink signals, though partially overlapping and simultaneously remaining with the tolerance of a given channel (e.g., a given frequency or time slot), is delayed with respect to the other. In one embodiment, wherein the first and second uplink signals each represent a burst of data, which burst may span several bits in length (e.g., 100 or more bits in one embodiment), the first uplink signal may be received by the BS with a ½ bit time offset relative to the second uplink signal. Depending on the tolerance of the channel(s) in a given system in which the present invention is employed, the offset may be greater or less than ½ bit.

In an alternative embodiment, the offset represents a frequency shift, such that the first uplink signal is transmitted by the first remote user terminal to the BS with a slightly different carrier frequency than the second uplink signal transmitted to the BS by the second remote user terminal.

At block 54, the BS receives the first and second uplink signals, which are offset relative to each other.

At block 56, the BS, based on the offset, distinguishes between the first and second uplink signals and determines that the first uplink signal is associated with the first remote user terminal. In one embodiment of the invention, the BS may also determine, based on the offset, that the second uplink signal is associated with the second remote user terminal. As such, the BS identifies the source of one or more signals that share the same or substantially same (depending on the extent and type of offset, such as a ½ bit time offset between first and second data streams transmitted to the BS by first and second remote user terminals, respectively) frequency channel and time slot for transmission and reception.

The method described with reference to FIG. 3 may be implemented in a number of types of wireless communication systems wherein users operate on the same frequency channel and time slot. For example, in one embodiment, the invention is embodied in an implementation of the Personal Handyphone System (PHS) that supports spatial channels.

In the current PHS system, a pure carrier frequency is quadrature phase modulated into a signal that includes a stream of symbols (each spanning 5.2 microseconds, which is referred to as the symbol time), and the phase of the signal, which is modulated to lie in one of the four quadrants of complex space, is represented by two bits. Thus, the data rate is 394 kbps. The signal occurs as a 625 microsecond burst of 120 symbols, which also "guard times" at either end of the burst length. This 625 microsecond burst occurs only at discreet times in a larger 20 millisecond frame.

Of the 120 symbols in a burst, 72 symbols actually carry the 144-bit data payload of the burst, while the other symbols serve other functions. For example, of the remaining non-payload 48 symbols, some serve as "guard" and "ramp" symbols for buffering the ends of the burst, various fixed patters of bits to aid in demodulation, and a 16-bit checksum that is calculated from, and appended to, the data payload.

Before the burst is transmitted, (e.g., from a remote user terminal to a BS), the 160-bit portion consisting of the data payload and the checksum are scrambled according to a pattern that is unique to each BS. Upon receipt of the burst by a BS, the 160 bit portion is unscrambled with an appropriate key, and the checksum is recalculated and compared with that appended to the data payload. If the checksum recalculated by the BS matches the checksum appended to the data payload, the burst is deemed "good." On the other hand, a non-matching checksum would indicate a "bad" burst, whose intended destination was another BS. As such, a BS may discard bursts intended for other BS's by attempting to unscramble such bursts with the wrong pattern (as indicated by that particular BS's key) to determine that the checksums to do not match.

If the PHS system is implemented using spatial channels, then a first and a second burst received by a BS and (intentionally) transmitted to the BS from first and second remote user terminals, respectively, may be indistinguishable, because the checksums for both bursts will match. In accordance with one embodiment of the invention, however, the two bursts are distinguished by the BS because the BS causes the arrival times of the bursts to differ (i.e., be offset in time relative to each other). For example, in one embodiment, the offset is equal to at least ½ bits in duration.

By causing uplink signals to be offset relative to each other, the BS applies unscrambling and check sum matching with the same delay offset appropriate to the remote user terminal whose burst was delayed, in order to distinguish the burst transmitted by that remote user terminal from one or more other bursts transmitted by other remote user terminals. For example, if the checksum comparison operation succeeds (i.e., a match or "good" burst is found), then the remote user terminal of interest, or at least the burst associated therewith, has been identified and separated from the other burst(s). On the other hand, if the checksum comparison operation fails, then the BS, in accordance with one embodiment of the invention, repeats unscrambling and checksum comparison with different time delay offsets, each corresponding to a particular user, until the checksum operation succeeds, in which case the burst associated with a desired remote user terminal of interest is identified. As such, any number of remote user terminals may have their uplink transmissions delayed relative to each other by the BS, such that the BS, when processing such signals will identify each uplink signal and its corresponding remote user terminal based on the relative offset used to process the particular uplink signal (and/or the other uplink signals).

In another embodiment embodied in a PHS system that supports spatial channels, the BS checks for the presence of the fixed patterns of bits—namely, the recalculated checksum—in the received burst at an arrival time consistent with that associated with a remote user terminal of interest. The BS may then determine the source associated with the burst, also referred to as the burst identifier (BID) by attempting to find the particular pattern at each of the known delay offsets associated with each remote user terminal. As such, it is assumed in this embodiment that the BS causes one or several remote user terminals each to delay their transmissions, and the BS maintains a record of the relative delay offset assigned to each of the one or several remote user terminals'transmission.

The invention is especially useful in, although not limited to, spatial processing systems in which multiple remote user terminals share the same channel and a hub communication device, such as a BS, is typically equipped with multiple antennas each of whose signals are combined. As such, the invention provides a method and apparatus to "separate" and identify combined signals on the same frequency and time channels to determine the BID for each signal. For example, in one embodiment, a BS equipped with multiple antennas (i.e., an antenna array) combines the signals from the antennas in such a way that the resultant summed signal bears the closest resemblance to a desired remote user's transmitted signal, free from the other (undesired) received signal(s).

In one embodiment of the invention, "uncorrelating" the combined signals of an antenna array to identify the signal associated with a desired remote user is performed in a Constant Modulus Algorithm (CMA) system. In accordance with known CMA methodology, a least-squares fit of the received signal to a signal of constant modulus is produced. In the PHS system, for example, the phase-modulated burst is filtered before transmission to fit into a 300 kHz wide channel, causing the burst signal to vary in amplitude from symbol to symbol. If the burst is sampled "on baud" (i.e., at the time-center of each symbol), the samples will be equal in amplitude. On the other hand, if the burst is sampled "off baud" (i.e., not at the time-center of each symbol), for example, as caused by a time delay offset in accordance with one embodiment of the invention, then the magnitudes vary from sample to sample. As such, in one embodiment of the invention, by sampling the combined signal "on baud" for a desired remote user terminal's uplink signal (e.g., a burst), the BS causes the uplink signals of other remote user terminals to be sampled "off baud," and as such, only the uplink signal associated with the desired remote user terminal will be constant modulus, and thus may be distinguished and identified. As such, the CMA method, in conjunction with one embodiment of the invention, will optimally converge to the desired remote user terminal's uplink signal and discard the other signals (e.g., uplink signals from remote user terminals sharing the same channel as the desired remote user).

Of course, the invention may be utilized in conjunction with other algorithms to "uncorrelate" undesired signals based on convergence/correlation to the desired signal. For example, in one embodiment, the invention is utilized in conjunction with a "decision-directed" algorithm wherein the received, sampled signal is plotted in complex space and compared to an "ideal" constellation, such that only a signal sampled "on baud" will be correlated with the ideal constellation, and thus, the other signal(s) may be discarded.

It should be appreciated that the invention utilizes various mechanisms in various embodiments to facilitate a BS or other communication device to cause a remote user terminal to offset its uplink transmission relative to that of another remote user terminal's uplink transmission. For instance, in duplex systems, the BS explicitly transmits a downlink message to the particular remote user terminal instructing it to adjust its uplink transmission timing, so as to cause a relative offset between that user unit's transmissions and another(s)'s. In another embodiment, where a remote user terminal adjusts its timing simply in accordance with the timing of downlink transmissions from the BS to the remote user terminal, such as performed in the PHS system, the BS can cause the offset by intentionally delaying or advancing its downlink transmission to one or more remote user terminals in order to cause the remote user terminal to adjust its uplink transmission timing according to a desired offset that will be used by the BS to identify the (source of) the uplink transmissions of that remote user terminal. In the case of a PHS BS that supports spatial channels, where (downlink) signals to multiple user units sharing the same frequency channel are transmitted by the BS simultaneously, in accordance with one embodiment of the invention, the BS independently delays each downlink signal (directed to a particular remote user terminal) relative to the other downlink signal(s) directed to other remote user terminals before combining and transmitting such signals as a combination.

It should be appreciated that the invention is not restricted to aiding a single base station to separate signals from multiple users sharing the same channel. In a network-wide deployment of the invention, for example, as utilized in a cellular communication system, each base station may cause its remote user terminals to transmit within their channels with extra offsets. As such, when such remote user terminals act as interferers with respect to one or more surrounding base stations, the one or more surrounding base stations can identify and "remove" the unwanted signals based on the offset(s).

Furthermore, in an alternative embodiment of the invention, a base station may cause remote user terminals occupying distinct channels to transmit with different timings, such that the remoter user terminals may later be directed by the base station to relatively quickly occupy the same physical channel. In some systems, such as PHS, for example, such direction by the base station will mitigate the relatively slow time-constant with which remote user terminals respond to timing changes from the base station. Thus, a newly established spatial channel can be made robust almost immediately.

It will be appreciated that the invention is not limited to the above-described method(s) of causing a relative time offset between uplink signals of multiple remote user terminals. In fact, the invention may utilize frequency, rather than time, offset between signals associated with multiple remote user terminals to distinguish the signals associated therewith.

It will further be appreciated that each of the elements depicted in the Figures and described above may be implemented in hardware, software, or a combination thereof. It should be appreciated that the invention may be employed exclusively in software, in one embodiment, to include a software module for causing offsets between uplink signal transmissions, and another software module to distinguish the uplink signals based on the relative offsets that caused therebetween. Such software modules may be stored in a data storage medium accessible by execution circuitry, such as general purpose or digital signal processing (DSP) or other data processing device/circuitry.

Although the invention has been described with reference to several embodiments, it will be appreciated that various alterations and modifications may be possible without departing from the spirit and scope of the invention, which is best understood by the claims that follow.

What is claimed is:

1. In a communication system, a method for distinguishing between the uplink transmissions of two or more sources, wherein said transmissions simultaneously occupy a channel, said method comprising:

a communication device causing a first remote user terminal to adjust transmission of a first uplink signal transmitted by said first remote user terminal by an offset within a spatial channel relative to a second uplink signal transmitted by a second remote user terminal, said first and second uplink signals occupying the same spatial channel; and said communication device distinguishing, based on said offset, said first uplink signal from said second uplink signal.

2. The method of claim 1, further comprising:
said communication device transmitting a coded message to said first remote user terminal to cause said offset.

3. The method of claim 2, further comprising:
said communication device providing said coded message in a timing signal to said first remote user terminal.

4. The method of claim 1, wherein said communication device comprises an adaptive array.

5. The method of claim 1, further comprising:
said communication device processing a combined signal comprising said first uplink signal and said second uplink signal;
said communication device determining an uncorrelation in said combined signal, said uncorrelation caused by said offset; and
said communication device extracting, based on said uncorrelation, a desired signal from said combined signal to identify said first uplink signal being associated with said first remote user terminal.

6. The method of claim 1, further comprising:
said communication device processing a combined signal comprising said first uplink signal and said second uplink signal;
said communication device comparing relative times of transmission of each of said first and second uplink signals in said combined signal with at least one reference time;
said communication device extracting, based on said comparing of said relative times of transmission of each of said first and second uplink signals with said reference time, a desired signal from said combined signal.

7. The method of claim 1, wherein said offset represents a temporal delay between said first uplink signal and said second uplink signal.

8. The method of claim 1, wherein said offset represents a frequency offset between said first uplink signal and said second uplink signal.

9. The method of claim 1, further comprising said communication device causing said offset by adjusting transmission of one of a first downlink signal and a second downlink signal transmitted by said communication device to said first remote user terminal and said second remote user terminal, respectively.

10. The method of claim 1, wherein said communication device operates in accordance with a time division multiple access protocol, and wherein said first uplink signal and second uplink signal partially overlap in a time slot representing the channel.

11. The method of claim 1, wherein said first uplink signal and said second uplink signal partially overlap with respect to a specific carrier frequency channel for communication, such that each of the first and second uplink signals lie within an allowable frequency deviation for the specific carrier frequency channel.

12. The method of claim 1, further comprising:
said communication device identfying, based on said adjustment, said second uplink signal being associated with said second remote user terminal.

13. A machine-readable medium having stored thereon a set of machine-executable instructions, that, when executed by a machine, cause said machine to perform a method comprising:
a communication device causing an offset within a spatial channel between a first uplink transmission to said communication device by a first remote user terminal and a second uplink transmission to said communication device by a second remote user terminal, wherein said first and second uplink transmissions at least partially overlap in a spatial channel, such that both the first and second uplink transmissions lie within an allowable tolerance of said channel; and
said communication device distinguishing, based on said offset, between said first uplink signal and said second uplink signal.

14. The machine-readable medium of claim 13, wherein said method further comprises:
said communication device causing said offset by adjusting a first downlink transmission to said first remote user terminal, said first downlink transmission preceding said first and second uplink transmissions, relative to a second downlink transmission to said second remote user terminal, said second downlink transmission preceding said first and said second uplink transmissions.

15. The machine-readable medium of claim 13, wherein said communication device is part of a base station that comprises an adaptive array.

16. The machine-readable medium of claim 13, wherein said method further comprises:
said communication device processing a combined signal comprising said first uplink signal and said second uplink signal;
said communication device determining an uncorrelation in said combined signal, said uncorrelation caused by said offset; and
said communication device extracting, based on said uncorrelation, a desired signal from said combined signal to identify said first uplink signal being associated with said first remote user terminal.

17. The machine-readable medium of claim 13, wherein said method further comprises:
said communication device processing a combined signal comprising said first uplink signal and said second uplink signal;
said communication device comparing relative times of transmission of each of said first and second uplink signals in said combined signal with at least one reference time;
said communication device extracting, based on said comparing of said relative times of transmission of each of said first and second uplink signals with said reference time, a desired signal from said combined signal.

18. The machine-readable medium of claim 13, wherein said offset represents a temporal delay between said first uplink signal and said second uplink signal.

19. The machine-readable medium of claim 13, wherein said offset represents a frequency offset between said first uplink signal and said second uplink signal.

20. An apparatus for distinguishing between the uplink transmissions of two or more remote user terminals simultaneously occupying a transmission channel, the apparatus comprising:

a first means for causing a first remote user terminal to adjust transmission of a first uplink signal transmitted by said first remote user terminal by an offset within a spatial transmission channel relative to a second uplink signal transmitted by a second remote user terminal, said first and second uplink signals occupying the spatial transmission channel; and a second means for distinguishing between said first and second uplink signal based on said offset.

21. The apparatus of claim 20, wherein said first means comprises a means for causing a coded message to be transmitted to said first remote user terminal to cause said adjustment.

22. The apparatus of claim 20, wherein said first means comprises an adaptive antenna array.

23. The apparatus of claim 20, wherein said second means comprises:

a means for processing a combined signal comprising said first uplink signal and said second uplink signal;

a means for comparing relative times of transmission of each of said first and second uplink signals in said combined signal with at least one reference time; and a means for extracting, based on said comparing of said relative times of transmission of each of said first and second uplink signals in said combined signal with said reference time, a desired signal from said combined signals.

24. The apparatus of claim 20, wherein said offset represents a temporal delay between said first uplink signal and said second uplink signal.

25. The apparatus of claim 20, wherein said offset represents a frequency shift between said first uplink signal and said second uplink signal.

26. The apparatus of claim 20, wherein said first means comprises:

means for adjusting transmission of one of a first downlink signal and a second downlink signal associated with said first remote user terminal and said second remote user terminal, respectively, wherein said first uplink signal and said second uplink signal are offset by an amount that is a function of a relative offset between said first and second downlink signals.

27. The apparatus of claim 20, wherein said communication device operates in accordance with a time division multiple protocol, and wherein said first uplink signal and said second uplink signal partially overlap in a time slot representing the channel.

28. The apparatus of claim 20, wherein said first uplink signal and said second uplink signal partially overlap with respect to a carrier frequency channel for communication, such that each of the first and second uplink signals lie within an allowable frequency deviation for the carrier frequency channel.

29. The apparatus of claim 20, wherein said second means further comprises means for identifying, based on said offset, said first uplink signal being associated with said first remote user terminal.

30. An apparatus for separating the uplink transmissions of two or more remote user terminals simultaneously occupying a transmission channel, the apparatus comprising:

a first means for causing a first remote user terminal to adjust transmission of a first uplink signal transmitted by said first remote user terminal by an offset within a spatial transmission channel relative to a second uplink signal transmitted by a second remote user terminal, said first and second uplink signals occupying the spatial transmission channel; and a second means for separating said first and second uplink signal based on said offset.

31. The apparatus of claim 30, wherein said first means comprises a means for causing a coded message to be transmitted to said first remote user terminal to cause said offset.

32. The apparatus of claim 30, wherein said first means comprises an adaptive antenna array.

33. The apparatus of claim 30, wherein said second means comprises:

a means for processing a combined signal comprising said first uplink signal and said second uplink signal;

a means for comparing relative times of transmission of each of said first and second uplink signals in said combined signal with at least one reference time; and a means for extracting, based on said comparing of said relative times of transmission of each of said first and second uplink signals in said combined signal with said reference time, a desired signal from said combined signals.

34. The apparatus of claim 30, wherein said offset represents a temporal delay between said first uplink signal and said second uplink signal.

35. The apparatus of claim 30, wherein said offset represents a frequency shift between said first uplink signal and said second uplink signal.

36. The apparatus of claim 30, wherein said first means comprises:

means for adjusting transmission of one of a first downlink signal and a second downlink signal associated with said first remote user terminal and said second remote user terminal, respectively, wherein said first uplink signal and said second uplink signal are offset by an amount that is a function of a relative offset between said first and second downlink signals.

37. The apparatus of claim 30, wherein said communication device operates in accordance with a time division multiple access protocol, and wherein said first uplink signal and said second uplink signal partially overlap in a time slot representing the channel.

38. The apparatus of claim 30, wherein said first uplink signal and said second uplink signal partially overlap with respect to a carrier frequency channel for communication, such that each of the first and second uplink signals lie within an allowable frequency deviation for the carrier frequency channel.

39. The apparatus of claim 30, wherein said second means further comprises means for identifying, based on said offset, said first uplink signal being associated with said first remote user terminal.

40. In a communication system employing spatial transmission channels, a method for distinguishing between the uplink transmissions of two or more remote user terminals utilizing the spatial transmission channels, said method comprising:

a base station causing an offset within a spatial transmission channel between a first uplink transmission and a second uplink transmission of a first and second remote user terminal, respectively; and said base station, based on the offset, causing the first and second uplink signals to be distinguishable relative to each other.

41. The method of claim 40, wherein the offset is caused by the base station transmitting a first downlink signal to be received by the first remote user terminal offset relative to transmitting a second downlink signal to be received by the second remote user terminal.

42. In a communication system employing spatial transmission channels, a method for separating the uplink transmissions of two or more remote user terminals utilizing the spatial transmission channels, said method comprising:

a base station causing an offset within a spatial transmission channel between a first uplink transmission and a second uplink transmission of a first and second remote user terminal, respectively; and said base station, based on the offset, causing the first and second uplink signals to be separable from each other.

43. The method of claim 42, wherein the offset is caused by the base station transmitting a first downlink signal to be received by the first remote user terminal offset relative to transmitting a second downlink signal to be received by the second remote user terminal.

44. The method of claim 7, wherein said time offset is equal to at least a symbol.

45. The method of claim 44, wherein said symbol is equal to at least one-half binary digit.

46. The machine-readable medium of claim 18, wherein said temporal delay is equal to at least a symbol.

47. The machine-readable medium of claim 46, wherein said symbol is equal to at least one-half binary digit.

48. The apparatus of claim 24, wherein said temporal delay is equal to at least a symbol.

49. The apparatus of claim 48, wherein said symbol is equal to at least one-half binary digit.

50. The apparatus of claim 34, wherein said temporal delay is equal to at least a symbol.

51. The apparatus of claim 50, wherein said symbol is equal to at least one-half binary digit.

* * * * *